(12) United States Patent
Nandy et al.

(10) Patent No.: US 8,547,874 B2
(45) Date of Patent: Oct. 1, 2013

(54) METHOD AND SYSTEM FOR LEARNING NETWORK INFORMATION

(75) Inventors: Kousik Nandy, Shivalingaiah Colony (IN); Manikchand Roopchand Bafna, Near Cotton Market (IN); Pratima Pramod Sethi, Jayanagar 1$^{st}$ Block (IN); Shashidhar P. Patil, Bannerghatta Road (IN)

(73) Assignee: Cisco Technology, Inc., San Jose, CA (US)

( * ) Notice: Subject to any disclaimer, the term of this patent is extended or adjusted under 35 U.S.C. 154(b) by 876 days.

(21) Appl. No.: 11/173,441

(22) Filed: Jun. 30, 2005

(65) Prior Publication Data

US 2007/0002768 A1    Jan. 4, 2007

(51) Int. Cl.
*H04L 12/28* (2006.01)
*G06F 15/16* (2006.01)

(52) U.S. Cl.
USPC .............................. 370/255; 726/15

(58) Field of Classification Search
USPC ............... 370/255; 709/222, 229; 713/168, 713/153; 726/3, 12–15
See application file for complete search history.

(56) References Cited

U.S. PATENT DOCUMENTS

| | | | | |
|---|---|---|---|---|
| 6,438,612 B1* | 8/2002 | Ylonen et al. | ................ | 709/249 |
| 6,697,857 B1* | 2/2004 | Dixon et al. | ................ | 709/224 |
| 6,966,003 B1* | 11/2005 | Joseph et al. | ................ | 726/14 |
| 6,976,177 B2* | 12/2005 | Ahonen | ................ | 726/3 |
| 7,174,018 B1* | 2/2007 | Patil et al. | ................ | 380/258 |
| 7,305,706 B2* | 12/2007 | Moon et al. | ................ | 726/15 |
| 2002/0056001 A1* | 5/2002 | Magee et al. | ................ | 709/225 |
| 2003/0041136 A1* | 2/2003 | Cheline et al. | ................ | 709/223 |
| 2003/0177221 A1* | 9/2003 | Ould-Brahim et al. | ....... | 709/223 |
| 2003/0182431 A1* | 9/2003 | Sturniolo et al. | ............ | 709/227 |
| 2003/0191963 A1* | 10/2003 | Balissat et al. | ............... | 713/201 |
| 2004/0225895 A1 | 11/2004 | Mukherjee et al. | | |
| 2005/0283604 A1* | 12/2005 | Deshpande et al. | .......... | 713/160 |

OTHER PUBLICATIONS

S. Kent, "RFC 2401: Security Architecture for the Internet Protocol," Nov. 1998, Network Working Group, p. 6-28.*
Mogul, Jeffrey, "RFC 919: Broadcasting Internet Datagrams," Oct. 1984, Network Working Group, p. 1-6.*
Cisco, "Reverse Route Injection," First Published Aug. 16, 2001, Updated Apr. 5, 2011, http://www.cisco.com/en/US/docs/ios/sec_secure_connectivity/configuration/guide/sec_rev_rte_inject.pdf.*

* cited by examiner

*Primary Examiner* — Dang Ton
*Assistant Examiner* — Ryan Kavleski
(74) *Attorney, Agent, or Firm* — Fish & Richardson P.C.

(57) ABSTRACT

A method and system for learning network information through a plurality of network devices is provided. The plurality of network devices are configured for IPsec. The method enables negotiation between the network devices to set up a security association and provide network information between the configured network devices. This network information includes a plurality of sub-network routes.

23 Claims, 9 Drawing Sheets

| IDci | | IDcr | |
|---|---|---|---|
| TYPE | VALUE | TYPE | VALUE |
| ID_IPV4_ADDR_SUBNET | 0.0.0.0/0 | ID_IPV4_ADDR_SUBNET | 0.0.0.0/0 |

Fig. 9

METHOD AND SYSTEM FOR LEARNING NETWORK INFORMATION

BACKGROUND OF THE INVENTION

1. Field of Invention

Embodiments of the invention relate, in general, to routing of network traffic in a network. More specifically, the embodiments of the invention relate to methods and systems for learning network information, which include a plurality of sub-network routes.

2. Description of the Background Art

In the field of virtual private networks, information pertaining to various sub-networks is required, to route network traffic and apply Internet Protocol security (IPsec) policies on the network traffic.

In the present state of technology, Cisco's Reverse Route Injection (RRI) technology is used in the context of IPsec Virtual Private Networks (VPNs). RRI technology enables VPNs to learn information pertaining to sub-network routes. Further, RRI technology works on the basis of negotiated IPsec proxies, and learns information pertaining to the sub-network routes from the proxies negotiated during the Internet Key Exchange (IKE) Quick Mode exchange.

If there are 'N' networks behind an IPsec client router, the RRI mechanism minimally negotiates 'N' proxies (selectors) and creates 'N' security associations (SA) for the other end of the network, to learn about 'N' networks. Negotiating 'N' proxies and creating 'N' SAs can be a waste of resources, which is quite expensive.

BRIEF DESCRIPTION OF THE DRAWINGS

FIG. 9 is a table depicting a portion of a header file for packets transmitted through the IPsec tunnel, in accordance with an exemplary embodiment of the invention.

DETAILED DESCRIPTION OF EMBODIMENTS OF THE INVENTION

Various embodiments of the invention provide a method, a system, and a machine-readable medium for learning network information through a plurality of network devices in a computer network. In accordance with various embodiments of the invention, the network devices are negotiated for providing sub-network routes of the network.

In various embodiments of the invention, a method for learning network information, so as to route network traffic, is provided. The network information is learnt through a plurality of network devices such as network routing devices, clients, servers, proxies and hosts. In accordance with various embodiments of the invention, the plurality of network devices is configured for Internet Protocol Security (IPsec). The configured network devices are negotiated to set up a Security Association (SA). Further, the network information, including sub-network routes, is learnt through the plurality of network devices.

In various embodiments of the invention, a system for learning network information, in order to route network traffic, is provided. This system provides means for setting an SA associated with an IPsec tunnel and providing network information to the plurality of network devices configured for the IPsec.

Figure 1:
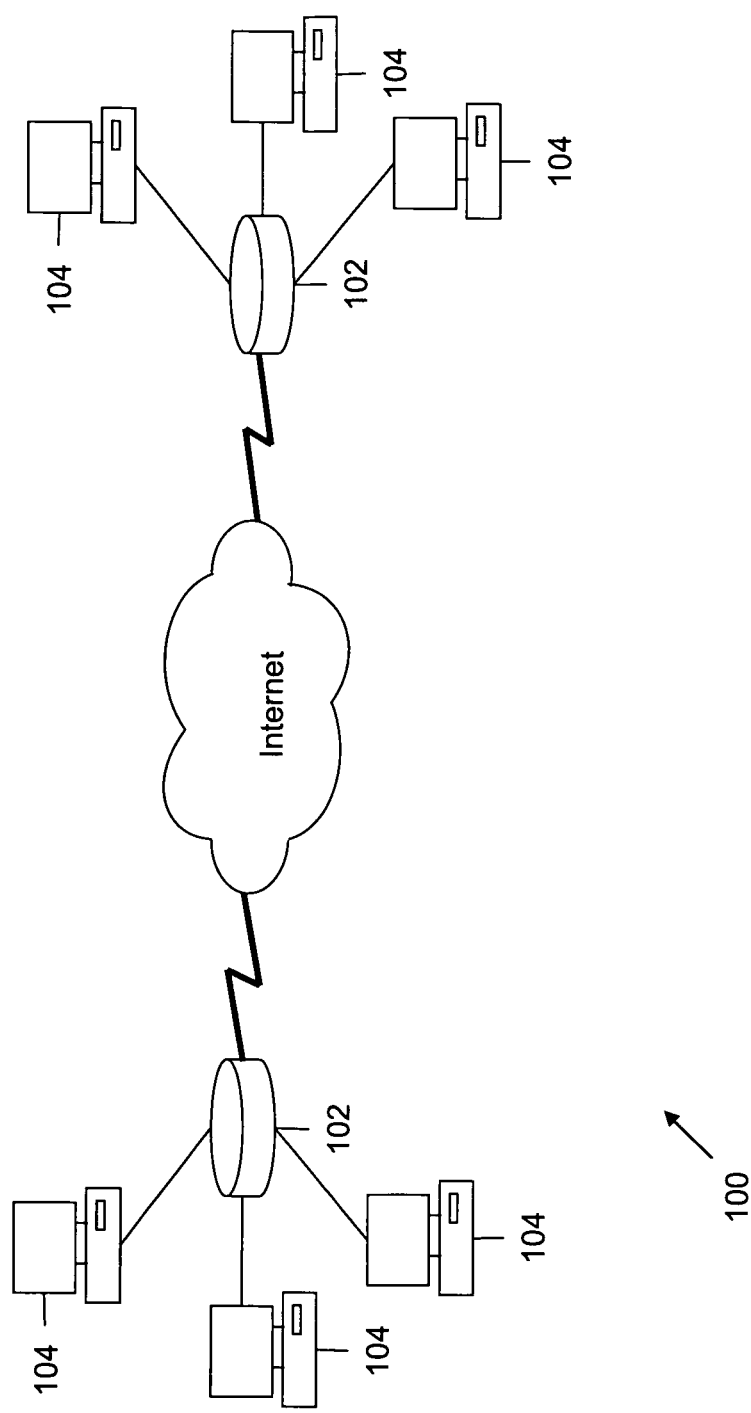
FIG. 1 illustrates a network for routing network traffic, in accordance with an exemplary embodiment of the invention.

FIG. 1 illustrates a network 100 for routing network traffic, in accordance with an exemplary embodiment of the invention. Information pertaining to sub-network routes is required to route network traffic through a plurality of network devices 102 and 104. In various embodiments of the invention, a single SA is set up for the plurality of network devices 102 and 104. The single SA is established for a particular network connection and determines the policies to be applied on the network traffic. In various embodiments of the invention, information pertaining to a plurality of sub-network routes is provided to the plurality of network devices 102 and 104 by learning the sub-network routes through mode configuration messages and Internet Security Association Key Management Protocol (ISAKMP) messages. Therefore, only a single SA is required. In various embodiments of the invention, the plurality of network devices 102 and 104 is negotiated to set up the SA and provide route injection. This has been described in detail in the following paragraphs.

In various embodiments of the invention, the network traffic is routed through an IPsec tunnel provided by an IPsec interface. The IPsec interface provides inline encapsulation of network traffic, to be transmitted through an IPsec tunnel. In various embodiments of the invention, different types of encapsulation, such as Generic Routing Encapsulation (GRE), IP encapsulation with IP (IPIP), are provided by the interface. Further, the IPsec interface provides the flexibility of adding one or more features to the existing IPsec interface. In various embodiments of the invention, the IPsec interface is implemented as a virtual tunnel interface.

In an embodiment of the invention, crypto maps may be used as an interface for negotiating network devices 102 and routing network traffic. A tunnel interface may be used in another embodiment of the invention. In various embodiments of the invention, virtual interfaces such as a virtual IPsec interface or a virtual tunnel interface may be used for negotiating network devices and routing network traffic.

Figure 2:
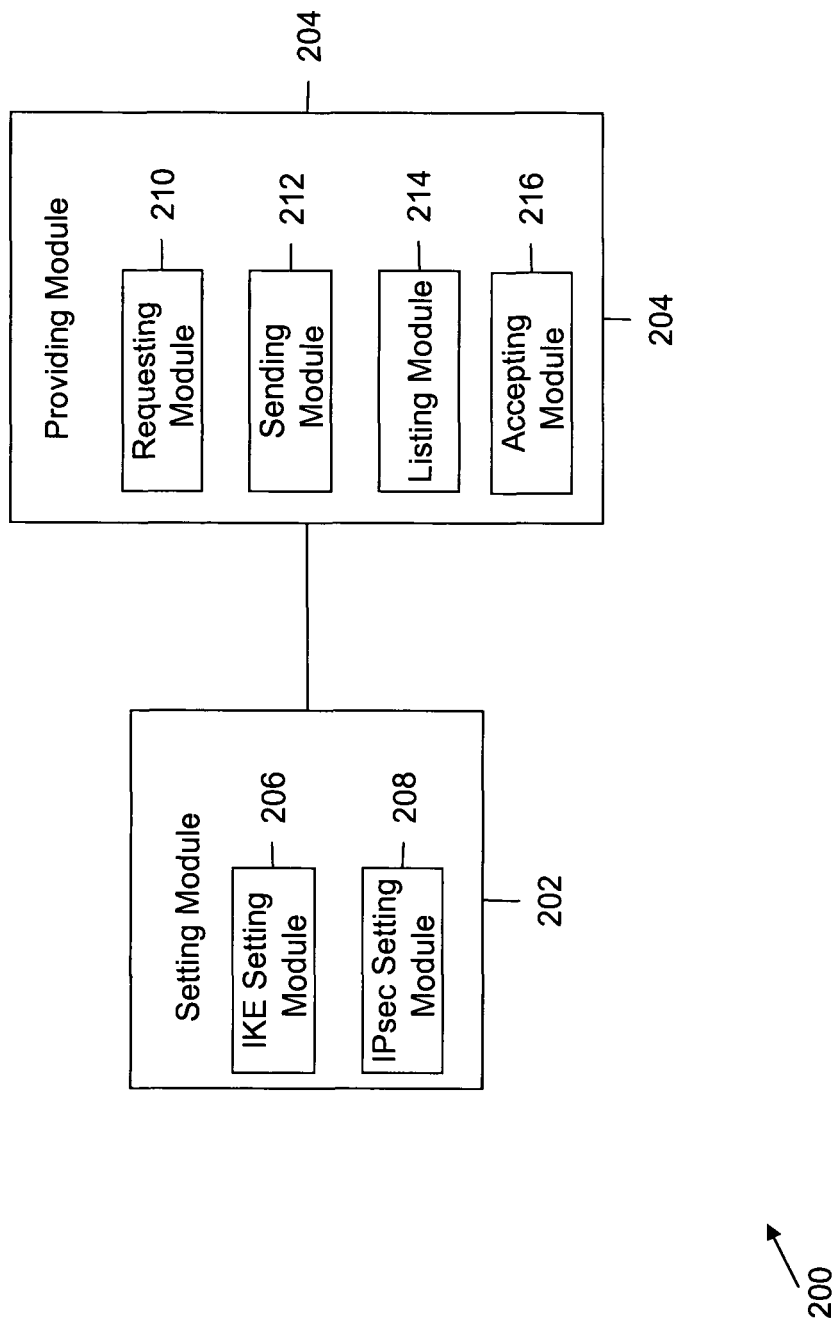
FIG. 2 is a block diagram depicting various system elements, to learn network information through network devices, in accordance with an exemplary embodiment of the invention.

FIG. 2 is a block diagram depicting a system 200 for learning network information through the network devices, in accordance with an exemplary embodiment of the invention. In an embodiment of the invention, system 200 is implemented in a Virtual Private Network (VPN). In another embodiment of the invention, system 200 is implemented in an Easy Virtual Private Network (EzVPN). System 200 includes a setting module 202 and a providing module 206. The SA is set between the plurality of network devices 102 by setting module 202. Further, information pertaining to a plurality of sub-network routes, based on the single SA being set, is provided to the endpoints of the IPsec tunnel through providing module 204.

In accordance with various embodiments, setting module 202 includes an IKE setting module 206 and an IPsec setting module 208. IKE setting module 206 is used for setting up an IKE SA and IPsec setting module 208 is used for setting up an IPsec SA. Further, in accordance with various embodiments providing module 204 includes a requesting module 210, a sending module 212, a listing module 214 and an accepting module 216. The steps performed by each element of providing module 204 have been described in detail in conjunction with FIG. 4. In various embodiments of the invention, each of elements of system 200 is implemented in the form of software, hardware or their combination thereof.

Figure 3:
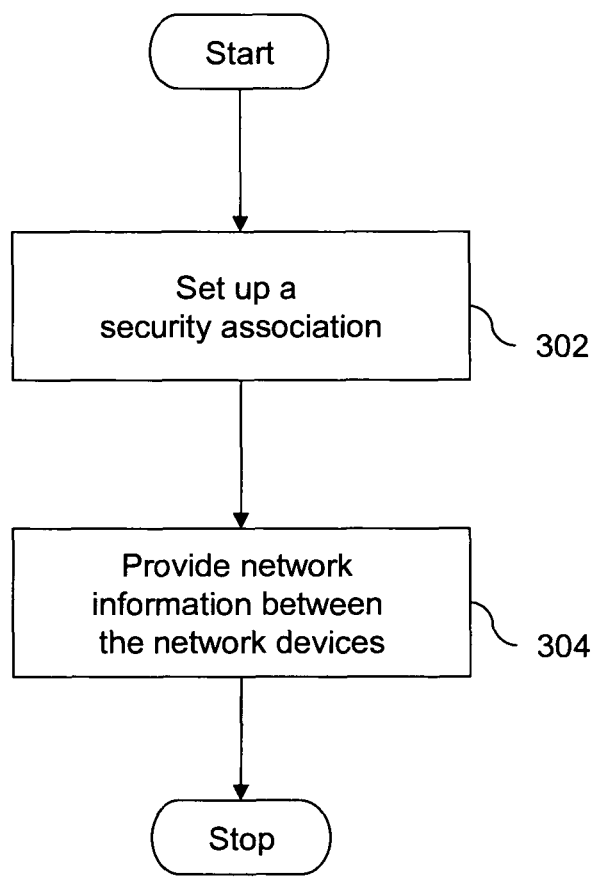
FIG. 3 is a flowchart depicting a method for learning network information, in accordance with an exemplary embodiment of the invention.

FIG. 3 is a flowchart depicting a method for learning network information through the plurality of network devices in network 100, in accordance with an exemplary embodiment of the invention. In various embodiments of the invention, any two network devices that are configured in the IPsec mode form the endpoints of the IPsec tunnel, and network traffic between them is routed through the IPsec tunnel. In various embodiments of the invention, the endpoints of the IPsec tunnel are at least one network routing device, client, server, proxy, host, or their combination thereof. In accordance with an embodiment of the invention, the plurality of devices is configured for IPsec by the network administrator. In accordance with another embodiment of the invention, the plurality of network devices are configured for IPsec through a configuration module.

At step 302, setting module 202 sets up an SA between the endpoints of the IPsec tunnel. In various embodiments of the invention, the SA includes an Internet Key Exchange (IKE) SA and an IPsec SA. In various embodiments of the invention, the SA is set up as a result of the negotiation between the network devices. This has been further explained in conjunction with FIG. 4.

At step 304, providing module 204 provides network information to the endpoints of the IPsec tunnel. The network information may include information related to the plurality of sub-network routes in the IPsec tunnel. Only one SA is set for the plurality of network devices at step 302, which requires for the network information including the sub-network routes to be provided to the plurality of network devices. In various embodiments of the invention, one or more messages are exchanged between the endpoints of the IPsec tunnel, to provide network information to the plurality of network devices. In various embodiments of the invention, ISAKMP can be used to exchange messages. This has been further explained in conjunction with FIG. 4.

In various embodiments of the invention, the negotiation between the endpoints of the IPsec tunnel for setting up SA and providing network information is initially started when a packet arrives at one of the endpoints of the IPsec tunnel. In various embodiments of the invention, the endpoints of the IPsec tunnel can be negotiated to re-establish the SA, if the SA has expired. In various embodiments of the invention, the endpoints of the IPsec tunnel negotiate with a single 'IP any any' proxy. The single IP any any proxy is a network device with any IP address. In various embodiments of the invention, network information is exchanged between the endpoints of an IPsec tunnel, providing the information to various network devices in the course of time. In other embodiments of the invention, the endpoints of an IPsec tunnel are not required to negotiate with all the other network devices.

Figure 4:
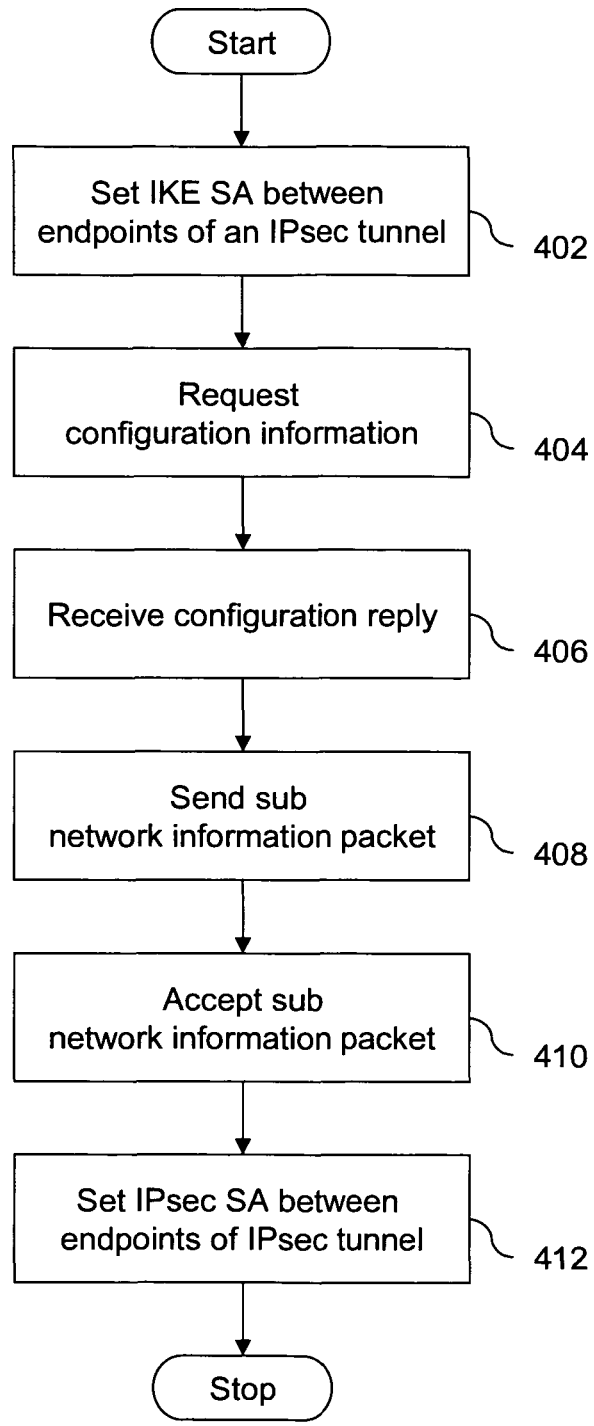
FIG. 4 is a flowchart depicting a method for learning sub-network routes through a plurality of network devices in the network, in accordance with an exemplary embodiment of the invention.

FIG. 4 is a flow chart depicting a method for learning sub-network routes through the network devices in network 100, in accordance with an exemplary embodiment of the invention. At step 402, the endpoints of the IPsec tunnel negotiate with one another to set up an IKE SA between them. IKE setting module 206 sets up the IKE SA between the endpoints. In an embodiment of the invention, three messages are exchanged between the endpoints, in order to set up the IKE SA. In another embodiment of the invention, the IKE SA is set up after six messages are exchanged between the endpoints. In various embodiments of the invention, messages are exchanged between the endpoints by using the ISAKMP message exchange mode. In various embodiments of the invention, a plurality of policies to be applied on the packets is exchanged through the ISAKMP messages. In an embodiment of the invention, the ISAKMP messages are used, for example, to send a request for the plurality of policies, receive the plurality of policies, etc.

At step 404, a first endpoint of the IPsec tunnel requests information pertaining to configuration through requesting module 210. The information is requested from a second endpoint of the IPsec tunnel. In an embodiment of the invention, the first endpoint is an IPsec client and the second an IPsec concentrator. Hereinafter, the first and second endpoints of the IPsec tunnel are referred to as an IPsec client and an IPsec concentrator. In various embodiments of the invention, the IPsec concentrator learns information pertaining to the plurality of sub-network routes from the IPsec client by sending the request, as described at step 404.

In an embodiment of the invention, the MODECONFIG_REQUEST message is used to find out if an IPsec concentrator has been configured in accordance with the single SA mode. In an embodiment of the invention, it is checked whether the IPsec concentrator supports a virtual interface and has been configured accordingly. In an embodiment of the invention, the request is sent in the form of an IKE_CFG_REQUEST.

At step 406, the IPsec concentrator sends a reply to the IPsec client by means of sending module 212. The reply contains configuration information pertaining to the IPsec concentrator. In various embodiments of the invention, the configuration information relates to the capabilities of the IPsec concentrator. These capabilities include the ability to learn information about the plurality of sub-network routes. In an embodiment of the invention, the reply is sent to the IPsec client in the form of an MODECONFIG_REPLY, as an MODECONFIG_IPSEC_INT_CONF attribute. The concentrator sets a value TRUE or FALSE in the MODECONFIG_IPSEC_INT_CONF attribute, to indicate whether the concentrator supports a virtual interface. In another embodiment of the invention, the reply is sent in the form of an IKE_CFG_REPLY.

At step 408, the IPsec client sends the information relating to the sub-network routes to the IPsec concentrator by means of listing module 214. This information flows in the form of information packets from the IPsec client to the IPsec concentrator. In an embodiment of the invention, the information contains a list of sub-network routes. The information packet is sent in the form of an IKE_CFG_SET. In an embodiment of the invention, the IPsec client may be an EzVPN client. In an embodiment of the invention, the MODECFG_IP4_ROUTE is used as an attribute to push sub-network routes to the concentrator with the CFG_ACK mechanism. In various embodiments of the invention, the sub-network routes are provided to the concentrator when the mode configuration is complete.

At step 410, the IPsec concentrator accepts the information packets and sends an acknowledgement to the IPsec client by means of accepting module 216. In an embodiment of the invention, the acknowledgement is sent in the form of a packet, which contains a list of all the sub-network routes received by the IPsec concentrator from the IPsec client. This packet acknowledges receipt and acceptance of information pertaining to various sub-network routes. In an embodiment of the invention, the acknowledgement packet is sent in the form of an IKE_CFG_ACK. In another embodiment of the invention, the MODECFG_IP4_ROUTE is used as an attribute to provide sub-network routes to the concentrator with CFG_ACK mechanism.

In various embodiments of the invention, providing module 204 performs the processes at steps 404, 406, 408 and 410.

At step 412, IPsec setting module 208 sets up an IPsec SA between the endpoints. In various embodiments of the invention, the IPsec SA provides the security policies that need to be applied to the packets being transmitted through the IPsec tunnel. In an embodiment of the invention, setting up the IPsec SA entails three messages being sent across the endpoints. In various embodiments of the invention, a single IPsec SA is provided by negotiating the endpoints of an IPsec tunnel. In the case of a single SA mode, sub-network routes replace Access Lists (ACL) as traffic selectors. In various embodiments of the invention, a default route is provided to route network traffic through an IPsec tunnel. In an embodiment of the invention, the IPsec SA for network devices is established in a non-split mode. In another embodiment of the invention, the IPsec SA for network devices is established in a split mode.

Every packet that forms the network traffic being transmitted through the IPsec tunnel is required to comply with several security policies or operations defined by the IPsec SA, which is specifically meant for communication between two or more entities in a network. The relationship between the entities is defined by a key, which is exchanged through the IKE protocol.

In various embodiments of the invention, a line protocol is equivalent to setting up the IPsec SA. The interface is said to be in the Up state when the line protocol is active, i.e., the IPsec SA is set up. The interface remains in the Down state until the IPsec SA is set up. In various embodiments of the invention, the IPsec tries to set up the IPsec SA, for example every 20 seconds until the IPsec SA is created. The interface may also go into Down state due to the expiry or deletion of the IPsec SA.

Further, it may be necessary to perform some checks on packets flowing from one device to another through the IPsec tunnel. Accordingly, some feature checks are performed on packets flowing into and from the IPsec tunnel.

Figure 5:
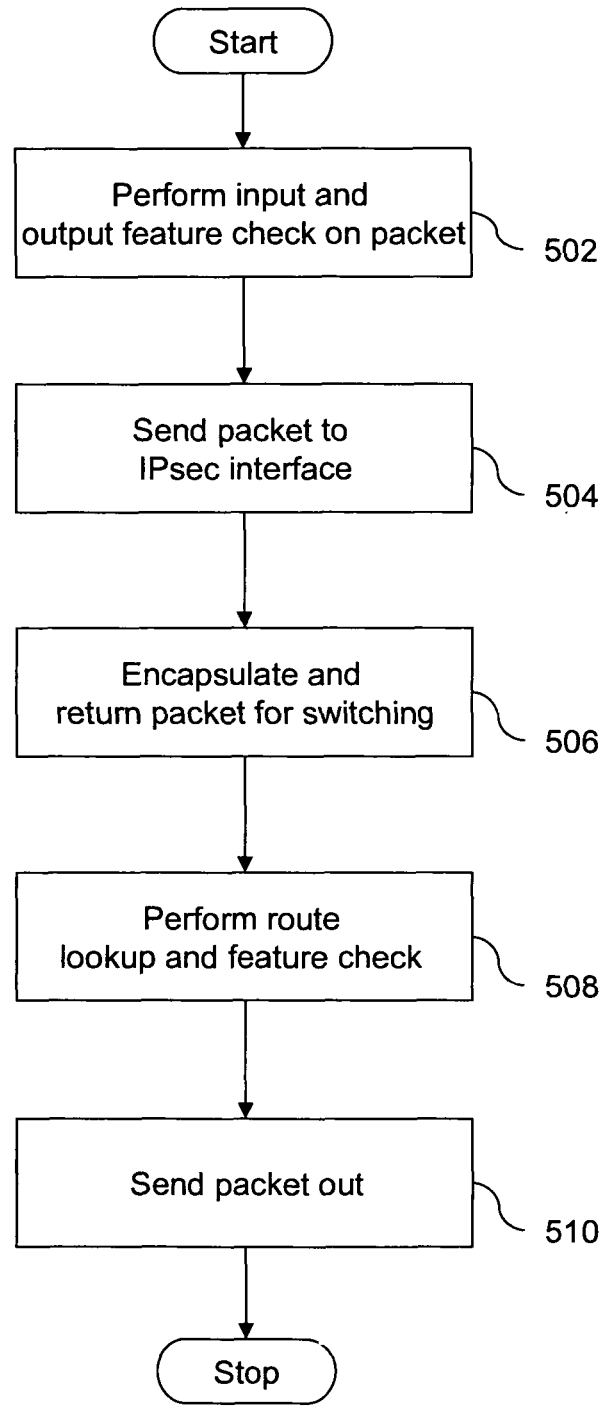
FIG. 5 is a flowchart depicting a method for transmitting packets into an IPsec tunnel, in accordance with an exemplary embodiment of the invention.

FIG. 5 is a flowchart depicting a method for forwarding packets into an IPsec tunnel, in accordance with an exemplary embodiment of the invention. Packets can be transmitted between various network devices in network 100.

At step 502, features of packets arriving at an ingress interface are checked. In various embodiments of the invention, input features such as, but not limited to, intrusion detection, the packet size, payload identifiers, etc., are checked. The ingress packets may be sent from one or more network devices. In various embodiments of the invention, the destination route of the packets is determined from the plurality of sub-network routes stored in network devices. Further, an output feature check is also performed on the packets, with relation to an IPsec tunnel interface.

At step 504, the packets are sent to the IPsec tunnel interface. Subsequently, the packets to be transmitted through the IPsec tunnel are checked for IPsec policy at the IPsec tunnel interface, and are thereafter forwarded to the Crypto Engine (CE) for encapsulation.

At step 506, the CE encapsulates the packets. According to various embodiments of the invention, the packets are thereafter returned to the IPsec tunnel interface for further switching.

At step 508, a route lookup for a new destination is performed. In an embodiment of the invention, the new destination is the other endpoint of the IPsec tunnel. In addition, an output feature check is performed on the packets, with relation to an output interface, for example, the Ethernet1 interface. In various embodiments of the invention, output features such as intrusion detection, the packet size, payload identifiers, etc., are checked. Subsequently, at step 510, the packets may be sent out through an egress interface.

Figure 6:
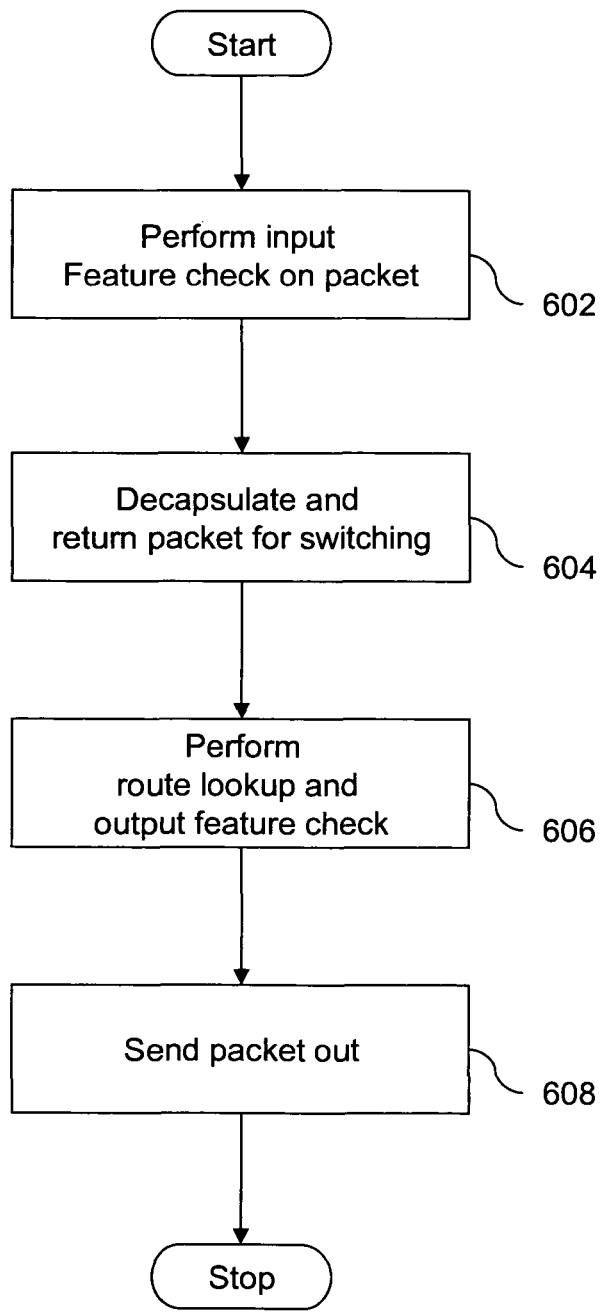
FIG. 6 is a flowchart depicting a method for transmitting packets from the IPsec tunnel, in accordance with an exemplary embodiment of the invention.

FIG. 6 is a flowchart depicting a method for transmitting packets from the IPsec tunnel, in accordance with an exemplary embodiment of the invention. At step 602, an input feature check is performed on the packets at the ingress interface. In various embodiments of the invention, the encapsulated packets arrive at an ingress interface. Thereafter, switching performs a feature check on the encapsulated packets.

At step 604, the CE decapsulates the packets associated with the IPsec tunnel interface and returns them to the IPsec tunnel for further switching. Further, at step 606, an input feature check is performed on the packets while switching, with relation to the IPsec tunnel interface. In various embodiments of the invention, a route lookup can also be performed for the packets. Thereafter, at step 608, the packets are sent to their respective destinations through the egress interface.

Figure 7:
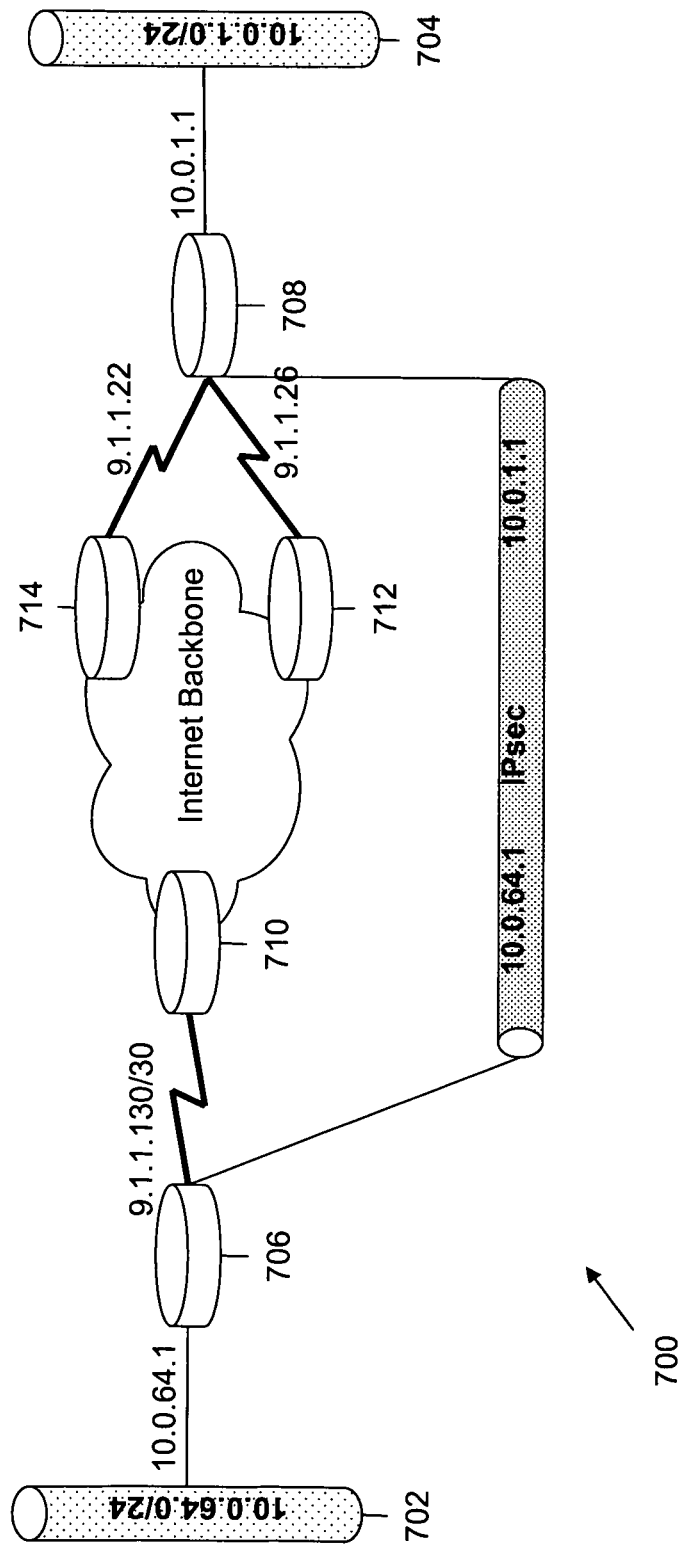
FIG. 7 illustrates a network for routing network traffic through an IPsec tunnel, in accordance with an exemplary embodiment of the invention.

FIG. 7 illustrates a network 700 for routing network traffic through an IPsec tunnel, in accordance with an exemplary embodiment of the invention. Devices 702, 704, 706, 708, 710, 712 and 714 are at least one of a network routing device, a client, a server, a proxy, a host, or their combinations thereof.

The devices, as shown in FIG. 7, may be configured to provide access link fault tolerance with a single IKE SA. In an embodiment of the invention, if a primary link Serial1/0.0 on device 708 goes into the down state, the packet may be routed through a Serial1/0.1 link. Therefore, the single IKE SA and IPsec SA continue to work for both the links.

In various embodiments of the invention, IKE keepalive mechanisms such as IKEV1, IKEV2, the delegated Path discovery (DPD), and the periodic DPD are used to determine whether the remote endpoints of the IPsec tunnel are still alive. This does not take into account the capability of the network traffic to reach the remote endpoint. Network traffic blackholes may be detected by IKE keepalive mechanisms.

Figure 8:
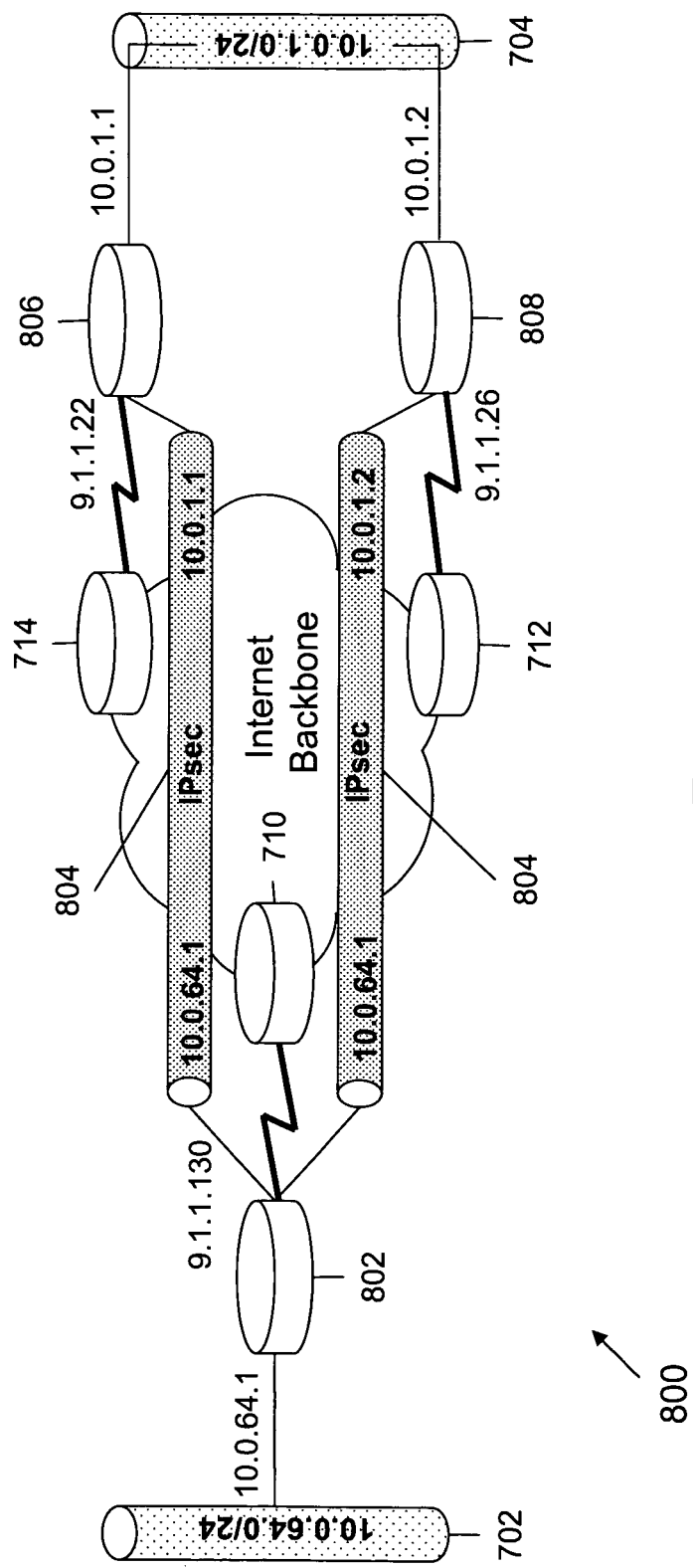
FIG. 8 illustrates a network for routing network traffic through an IPsec tunnel, in accordance with another exemplary embodiment of the invention.

FIG. 8 illustrates a network 800 for routing network traffic through an IPsec tunnel, in accordance with another exemplary embodiment of the invention. A device 802 maintains a routing database to determine which IPsec interface the traffic should use, in order to reach the other endpoint of the IPsec tunnel. In various embodiments of the invention, both the interfaces provided in network 800 are operational all the time. In an embodiment of the invention, dynamic fault tolerance is provided by network 800. IPsec tunnels 804 are maintained by the network devices to route the packets from one network device to another. Devices 806 and 808 are configured to provide redundant paths to the network traffic.

FIG. 9 is a table depicting a portion of a header file for packets being transmitted through the IPsec tunnel, in accordance with an exemplary embodiment of the invention. Payload identifiers IDci and IDcr for the IPsec client and the IPsec concentrator, respectively, are shown in FIG. 9. In various embodiments of the invention, the IP tunnel provides a path for transmitting packets with any IP addresses. Therefore, the value of the IP addresses associated with the sub-network routes has been kept to 0.0.0.0/0, permitting 'IP any any'.

Various embodiments of the present invention have the advantage that the endpoints of the IPsec tunnel need to negotiate with only one network device, in order to set up a SA for routing network traffic through an IPsec tunnel. Various embodiments of the invention provide an inexpensive routable interface.

Although the invention has been discussed with respect to specific embodiments thereof, these embodiments are merely illustrative, and not restrictive, of the invention. Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
    configuring, between a first tunnel endpoint device and a second tunnel endpoint device, a single security association for an interne protocol security (IPsec) tunnel, the first tunnel endpoint device servicing a first plurality of end devices and the second tunnel endpoint device servicing a second plurality of end devices, the second plurality being different from the first plurality of end devices, the single security association defining network traffic policies on network communications between the first and second endpoint devices, the configuring including:
        receiving a request, from the first tunnel endpoint device, for configuration information from the second tunnel endpoint device;
        sending configuration information to the first tunnel endpoint device, the configuration information including an indication that the second tunnel endpoint device supports a virtual interface;
        receiving, from the first tunnel endpoint device, a list of the plurality of sub-network routes to the second tunnel endpoint device;
        accepting the list of the plurality of sub-network routes;
        sending an acknowledgement to the first tunnel endpoint device, the acknowledgement including a list of the accepted plurality of sub-network routes; and
        based on the list of the plurality of sub-network routes, configuring the single security association for the IPsec tunnel, wherein the single security association includes a default route for routing network traffic through the IPsec tunnel;
    providing network information about the plurality of sub-network routes to the first and second plurality of end devices; and
    using the network information about the plurality of sub-network routes to route network traffic to the first plurality of end devices from the second plurality of end devices through the IPsec tunnel facilitated through the plurality of sub-network routes by the single security association.

2. The method of claim 1, wherein the setting up of the single security association further comprises exchanging sub-network route information between the first tunnel endpoint device and the second tunnel endpoint device.

3. The method of claim 1, wherein setting up the single security association occurs after the first tunnel endpoint device and the second tunnel endpoint device have exchanged a plurality of messages.

4. The method of claim 1, wherein setting up the single security association between the plurality of tunnel endpoint devices further comprises setting up an IPsec security association.

5. The method of claim 1 further comprising negotiating between the plurality of tunnel endpoint devices for re-establishing the single security association, if the single security association has expired.

6. The method of claim 1, wherein IPsec tunnel provides a path for transmitting packets with a plurality of destination IP addresses.

7. The method of claim 6, wherein packets include a single value for an IP address destination that allows the packet to be sent to the plurality of destination IP addresses.

8. The method of claim 7, wherein the IP address used is the same IP address for the plurality of sub-network routes and the network information is used to route the packet through a sub-network route in the plurality of sub-network routes.

9. An apparatus comprising:
    a computer processing system including a computer processor coupled to a display and user input device; and
    a machine-readable storage medium, being a non-transitory medium, including instructions executable by the computer processor comprising:
    one or more instructions for configuring, by the computer processor, a single security association between a first tunnel endpoint device and a second tunnel endpoint device for an interact protocol security (IPsec) tunnel, the first tunnel endpoint device servicing the first plurality of end devices and the second tunnel endpoint device servicing the second plurality of end devices, the second plurality being different from the first plurality of end devices, the single security association defining network traffic policies on network communications between the first and second endpoint devices, the configuring including:
        one or more instructions for receiving a request, from the first tunnel endpoint device, for configuration information from the second tunnel endpoint device;
        one or more instructions for sending configuration information to the first tunnel endpoint device, the configuration information including an indication that the second tunnel endpoint device supports a virtual interface;
        one or more instructions for receiving, from the first tunnel endpoint device, a list of the plurality of sub-network routes to the second tunnel endpoint device;
        one or more instructions for accepting the list of the plurality of sub-network routes;
        one or more instructions for sending an acknowledgement to the first tunnel endpoint device, the acknowledgement including a list of the accepted plurality of sub-network routes; and
        one or more instructions for configuring, based on the list of the plurality of sub-network routes, the single security association for the IPsec tunnel, wherein the single security association includes a default route for routing network traffic through the IPsec tunnel;
    one or more instructions for providing network information about the plurality of sub-network routes to the first and second plurality of end devices; and
    one or more instructions for using the network information about the plurality of sub-network routes to route network traffic to the first plurality of end devices from the second plurality of end devices through the IPsec tunnel facilitated through the plurality of sub-network routes by the single security association.

10. The method of claim 1, wherein the network traffic from the first plurality of end devices to the second plurality of end devices are configured to comply with the network traffic policies of the single security association.

11. The method of claim 1, wherein requesting configuration information is performed using a MODECONFIG_REQUEST message,
  wherein sending configuration information to the first tunnel endpoint device is performed using a MODECONFIG_IPSEC_INT_CONFIG attribute in a MODECONFIG_REPLY message, and
  wherein the indication that the second tunnel endpoint device supports a virtual interface is a value in the MODECONFIG_IPSEC_INT_CONFIG attribute.

12. The method of claim 1, wherein requesting configuration information is performed using an IKE_CFG_REQUEST message,
  wherein sending configuration information to the first tunnel endpoint device is performed using an IKE_CFG_REPLY message, and
  wherein sending the list of the plurality of sub-network routes to the second tunnel endpoint device is performed using an IKE_CFG_SET packet.

13. A system comprising:
  a configuring module for configuring, between a first tunnel endpoint device and a second tunnel endpoint device, a single security association for an interne protocol security (IPsec) tunnel, the first tunnel endpoint device servicing the first plurality of end devices and the second tunnel endpoint device servicing the second plurality of end devices, the second plurality being different from the first plurality of end devices, the single security association defining network traffic policies on network communications between the first and second endpoint devices, the configuring module including:
    a receiving module for receiving a request, from the first tunnel endpoint device, for configuration information from the second tunnel endpoint device;
    a sending module for sending configuration information to the first tunnel endpoint device, the configuration information including an indication that the second tunnel endpoint device supports a virtual interface;
    receiving, from the first tunnel endpoint device using the receiving module, a list of the plurality of sub-network routes to the second tunnel endpoint device;
    an accepting module for accepting the list of the plurality of sub-network routes;
    sending, by the sending module, an acknowledgement to the first tunnel endpoint device, the acknowledgement including a list of the accepted plurality of sub-network routes; and
    based on the list of the plurality of sub-network routes, configuring, by the configuring module, the single security association for the IPsec tunnel, wherein the single security association includes a default route for routing network traffic through the IPsec tunnel;
  a providing module for providing network information about the plurality of sub-network routes to the first and second plurality of end devices; and
  a routing module for using the network information about the plurality of sub-network routes to route network traffic to the first plurality of end devices from the second plurality of end devices through the IPsec tunnel facilitated through the plurality of sub-network routes by the single security association.

14. The system of claim 13, wherein the setting module comprises an IKE setting module for setting up an Internet Key Exchange (IKE) single security association between the plurality of tunnel endpoint devices of the IPsec tunnel.

15. The system of claim 13, wherein the setting module comprises an IPsec setting module for setting up an IPsec single security association between the plurality of tunnel endpoint devices of the IPsec tunnel.

16. The system of claim 13, wherein the plurality of tunnel endpoint devices are at least one of a network routing device, a client, a server, a proxy, a host.

17. The system of claim 13, wherein an IPsec interface provides inline encapsulation of network traffic.

18. The system of claim 13, wherein requesting configuration information is performed using a MODECONFIG_REQUEST message,
  wherein sending configuration information to the first tunnel endpoint device is performed using a MODECONFIG_IPSEC_INT_CONFIG attribute in a MODECONFIG_REPLY message, and
  wherein the indication that the second tunnel endpoint device supports a virtual interface is a value in the MODECONFIG_IPSEC_INT_CONFIG attribute.

19. The system of claim 13, wherein requesting configuration information is performed using an IKE_CFG_REQUEST message,
  wherein sending configuration information to the first tunnel endpoint device is performed using an IKE_CFG_REPLY message, and
  wherein sending the list of the plurality of sub-network routes to the second tunnel endpoint device is performed using an IKE_CFG_SET packet.

20. A system comprising:
  means for configuring, between a first tunnel endpoint device and a second tunnel endpoint device, a single security association for an interne protocol security (IPsec) tunnel, the first tunnel endpoint device servicing the first plurality of end devices and the second tunnel endpoint device servicing the second plurality of end devices, the second plurality being different from the first plurality of end devices, the single security association defining network traffic policies on network communications between the first and second endpoint devices, the configuring including:
    means for receiving a request, from the first tunnel endpoint device, for configuration information from the second tunnel endpoint device;
    means for sending configuration information to the first tunnel endpoint device, the configuration information including an indication that the second tunnel endpoint device supports a virtual interface;
    means for receiving, from the first tunnel endpoint device, a list of the plurality of sub-network routes to the second tunnel endpoint device;
    means for accepting the list of the plurality of sub-network routes;
    means for sending an acknowledgement to the first tunnel endpoint device, the acknowledgement including a list of the accepted plurality of sub-network routes; and
    based on the list of the plurality of sub-network routes, means for configuring the single security association for the IPsec tunnel, wherein the single security association includes a default route for routing network traffic through the IPsec tunnel;

means for providing network information about the plurality of sub-network routes to the first and second plurality of end devices; and means for using the network information about the plurality of sub-network routes to route network traffic to the first plurality of end devices from the second plurality of end devices through the IPsec tunnel facilitated through the plurality of sub-network routes by the single security association.

21. The apparatus of claim 9, wherein IPsec tunnel provides a path for transmitting packets with any IP addresses.

22. The apparatus of claim 9, wherein requesting configuration information is performed using a MODECONFIG_REQUEST message, wherein sending configuration information to the first tunnel endpoint device is performed using a MODECONFIG_IPSEC_INT_CONFIG attribute in a MODECONFIG_REPLY message, and wherein the indication that the second tunnel endpoint device supports a virtual interface is a value in the MODECONFIG IPSEC INT CONFIG attribute.

23. The apparatus of claim 9, wherein requesting configuration information is performed using an IKE_CFG_REQUEST message, wherein sending configuration information to the first tunnel endpoint device is performed using an IKE_CFG_REPLY message, and wherein sending the list of the plurality of sub-network routes to the second tunnel endpoint device is performed using an IKE_CFG_SET packet.

\* \* \* \* \*